(12) United States Patent
Tamaru et al.

(10) Patent No.: US 7,830,407 B2
(45) Date of Patent: Nov. 9, 2010

(54) IMAGE FORMING APPARATUS

(75) Inventors: Yasuo Tamaru, Nagoya (JP); Ryota Kato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/637,742

(22) Filed: Dec. 13, 2006

(65) Prior Publication Data

US 2007/0132830 A1 Jun. 14, 2007

(30) Foreign Application Priority Data

Dec. 13, 2005 (JP) ............................. 2005-359144

(51) Int. Cl.
*B41J 2/47* (2006.01)
*B41J 2/435* (2006.01)
(52) U.S. Cl. ...................................... 347/235; 347/250
(58) Field of Classification Search ........................ None
See application file for complete search history.

(56) References Cited

U.S. PATENT DOCUMENTS

| | | | | |
|---|---|---|---|---|
| 6,342,963 | B1 * | 1/2002 | Yoshino | 359/204 |
| 6,459,520 | B1 | 10/2002 | Takayama | |
| 6,771,296 | B2 | 8/2004 | Hayashi et al. | |
| 6,833,856 | B2 * | 12/2004 | Maeda | 347/248 |
| 2003/0067533 | A1 * | 4/2003 | Omori et al. | 347/248 |
| 2003/0156184 | A1 * | 8/2003 | Suzuki et al. | 347/249 |
| 2004/0169716 | A1 * | 9/2004 | Serizawa et al. | 347/245 |
| 2005/0024479 | A1 * | 2/2005 | Itabashi et al. | 347/243 |
| 2005/0093962 | A1 * | 5/2005 | Miyatake et al. | 347/235 |
| 2005/0173625 | A1 * | 8/2005 | Shiraishi | 250/234 |

FOREIGN PATENT DOCUMENTS

| | | |
|---|---|---|
| JP | 9-58053 | 3/1997 |
| JP | 10-307269 | 11/1998 |
| JP | 2000-89148 | 3/2000 |
| JP | 2000-180744 | 6/2000 |
| JP | 2001-34030 | 2/2001 |
| JP | 2001-108922 | 4/2001 |
| JP | 2001-121739 | 5/2001 |
| JP | 2001-318327 | 11/2001 |
| JP | 2002-107645 | 4/2002 |

(Continued)

*Primary Examiner*—Matthew Luu
*Assistant Examiner*—Kendrick X Liu
(74) *Attorney, Agent, or Firm*—McDermott Will & Emery LLP

(57) ABSTRACT

In an image forming apparatus, a polygon mirror, a plurality of laser generators, a first sensor, and a second sensor are disposed at a resin frame. A laser beam outputted from each of the laser generators and deflected by a deflection surface is irradiated onto a surface of a photosensitive drum to scan the surface over a scan part. The first sensor is disposed at a first position to detect a laser beam deflected by the deflection surface. The second sensor is disposed at a second position to detect a laser beam deflected by the deflection surface. A storage unit stores correspondence information indicating shift of the scan part from a reference scan part in relation to time difference between detections of the laser beam by the first and second sensor. A controller controls the laser generator to output a laser beam based on the shift of the scan part.

14 Claims, 7 Drawing Sheets

FOREIGN PATENT DOCUMENTS

| | | |
|---|---|---|
| JP | 2002-137450 | 5/2002 |
| JP | 2002-277778 | 9/2002 |
| JP | 2002-372676 | 12/2002 |
| JP | 2003-98458 | 4/2003 |
| JP | 2003-185953 | 7/2003 |
| JP | 2003-279873 | 10/2003 |

* cited by examiner

α ··· Detection time difference
β ··· Shift amount (shift amount of scanning start)

IMAGE FORMING APPARATUS

CROSS REFERENCE TO RELATED APPLICATIONS

This application claims priority from Japanese Patent Application No. 2005-359144 filed Dec. 13, 2005. The entire content of each of these priority applications is incorporated herein by reference.

TECHNICAL FIELD

The disclosure relates to an image forming apparatus, in particular, an image forming apparatus capable of correcting color shift due to temperature variation.

BACKGROUND

Conventionally, a color laser printer has a laser beam scanning device formed of a plurality of image forming optical systems in which a plurality of light beams each using a laser diode as a light source scan a photosensitive drum. Latent images obtained on the photosensitive drum by scanning of the light beam scanning device are made visible. The visible images are superimposed and transferred on a transfer sheet to form a multi-color image. The multi-color image is fixed to form a color image.

Internal temperature of the printer varies with location, operating time or the like due to heat generation of a fixing unit and heat caused by rotational driving of a rotational polygon mirror. Since variation in magnification error due to temperature variation becomes larger, a shift occurs in the magnification error of each of the plurality of image forming optical systems. To resolve the problem, according to Japanese Unexamined Patent Application Publication No. 10-307269, a two-point synchronizing method of operating frequency modulation of a laser diode (LD) and correcting shift by providing a synchronization detecting means at each of a scanning start end and a scanning termination end of the scanning laser beam and detecting a shift amount of the magnification error due to temperature variation by these synchronization detecting means is adopted.

However, position between the synchronization detecting means provided at the scanning start end and the scanning termination end of the laser beam also varies due to variation in the internal temperature of the image forming apparatus. For this reason, only by using the above-mentioned magnification error shift correction according to the two-point synchronizing method, shift of an image on the photosensitive drum cannot be appropriately corrected. Therefore, according to Japanese Unexamined Patent Application Publication No. 2002-372676, a temperature sensor is separately provided between two synchronization detecting means to correct shift of image length on the photosensitive drum on the basis of a signal from the temperature sensor.

However, according to Japanese Unexamined Patent Application Publication No. 2002-372676, it is necessary to separately provide a temperature sensor. For example, when the temperature sensor operates abnormally, resulting in wrong detection, color shift cannot be corrected with high accuracy.

SUMMARY

In view of the foregoing, it is an object of the invention to provide an image forming apparatus capable of performing color shift correction without providing a temperature sensor.

In order to attain the above and other objects, the invention provides an image forming apparatus including a frame resin, a polygon mirror, a plurality of laser generators, a photosensitive drum, a first sensor, a second sensor, a storage unit, a measuring unit, a calculating unit, and a controller. The frame is formed with a resin. The polygon mirror is disposed at the frame, and has a rotational shaft and a deflection surface rotatable about the rotational shaft. The plurality of laser generators is disposed at the frame. Each of the plurality of laser generators outputs a laser beam to the deflection surface. The photosensitive drum has a photosensitive surface. The laser beam deflected by the deflection surface is irradiated onto the photosensitive surface to scan the photosensitive surface over a scan part in a main scanning direction. The first sensor is disposed at the frame, and located at a first position to detect a laser beam deflected by the deflection surface. The second sensor is disposed at the frame, and located at a second position to detect a laser beam deflected by the deflection surface. The second position is different from the first position. The storage unit stores correspondence information indicating shift of the scan part from a reference scan part in relation to time difference between detections of the laser beam by the first sensor and the laser beam by the second sensor. The correspondence information varies with temperature variation in the frame. The measuring unit measures the time difference between detections of the laser beam by the first sensor and the laser beam by the second sensor. The calculating unit calculates the shift of the scan part based on both of the time difference measured by the measuring unit and the correspondence information. The controller controls the laser generator to output a laser beam based on the shift of the scan part calculated by the calculating unit.

Another aspect of the invention provides an image forming apparatus including a frame, a polygon mirror, a laser generator, a photosensitive drum, a first sensor, a second sensor, a measuring unit, a storage unit, a calculating unit, and a controller. The frame is formed with a resin. The polygon mirror is disposed at the frame, and has a rotational shaft and a deflection surface rotatable about the rotational shaft. The laser generator is disposed at the frame and outputs laser beam to the deflection surface. The laser beam includes a scanning beam, a first detection beam and a second detection beam. The photosensitive drum has a photosensitive surface. The scanning beam deflected by the deflection surface is irradiated onto the photosensitive surface to scan the photosensitive surface over a scan part in a main scanning direction. The first sensor is disposed at the frame, and located at a first position to detect the first detection beam deflected by the deflection surface. The second sensor is disposed at the frame, and located at a second position to detect the second detection beam deflected by the deflection surface. The second position is different from the first position. The measuring unit measures time difference between detections of the first detection beam by the first sensor and the second detection beam by the second sensor. The storage unit stores correspondence information indicating shift of the scan part from a reference scan part in relation to the time difference. The correspondence information varies with temperature variation in the frame. The calculating unit calculates the shift of the scan part based on both of the time difference measured by the measuring unit and the correspondence information. The controller controls the laser generator to output the scanning beam based on the shift of the scan part calculated by the calculating unit.

BRIEF DESCRIPTION OF THE DRAWINGS

Illustrative aspects in accordance with the invention will be described in detail with reference to the following figures wherein.

DETAILED DESCRIPTION

Figure 1:
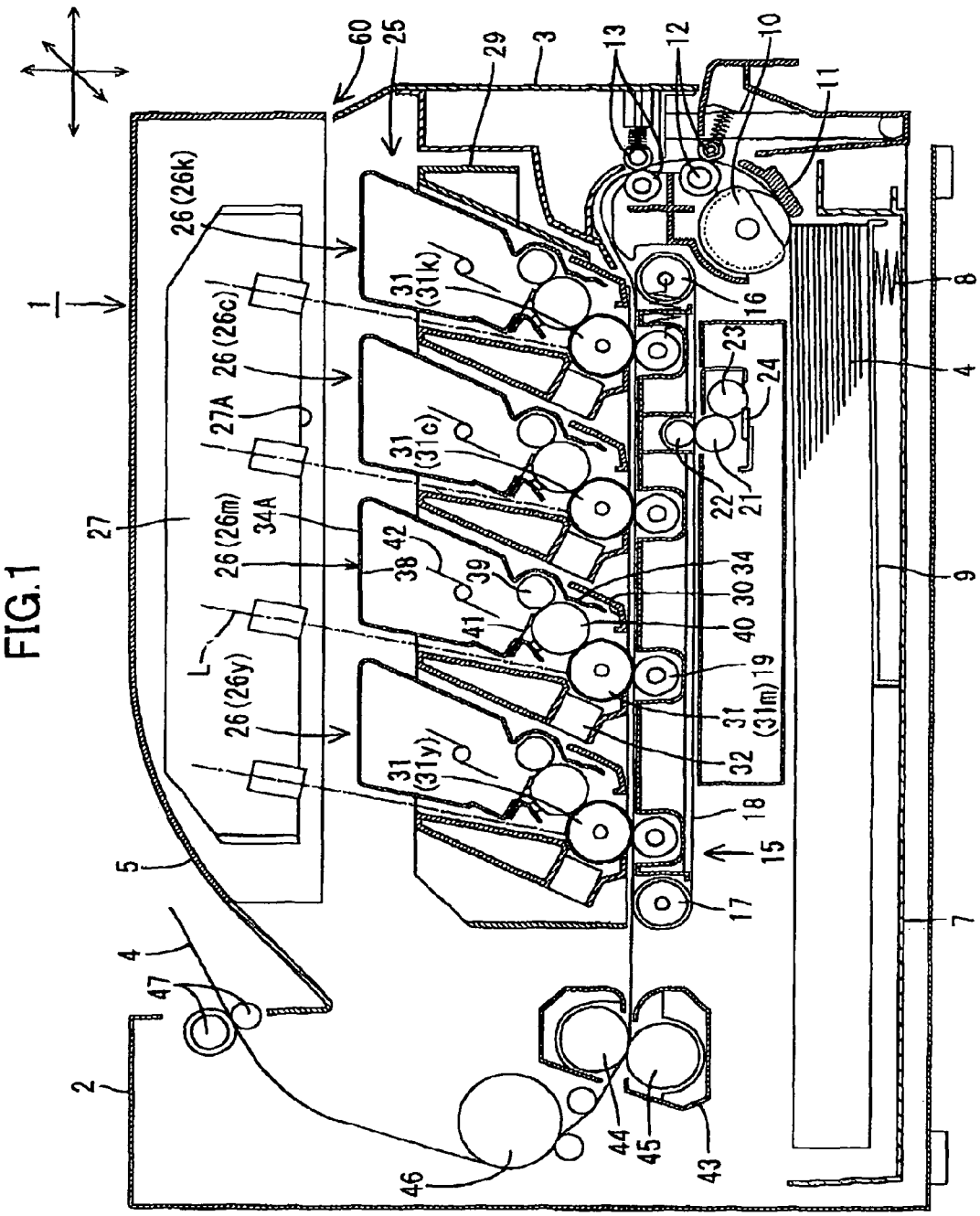
FIG. 1 is a side sectional view showing the schematic configuration of a laser printer in accordance with a illustrative aspect of the invention.

An image forming apparatus according to some aspects of the invention will be described while referring to the accompanying drawings wherein like parts and components are designated by the same reference numerals to avoid duplicating description.

<First Aspect>

A first aspect of the present invention will be described with reference to FIG. 1 to FIG. 7.

(Overall Configuration of Laser Printer)

FIG. 1 is a side sectional view showing the schematic configuration of a laser printer 1 as an image forming apparatus in accordance with the first aspect. In the following description, the right side in FIG. 1 is defined as the front side.

The laser printer 1 is a direct transfer tandem-type color laser printer and as shown in FIG. 1, has a substantially box-like the main body casing 2. An openable front cover 3 is provided on the front side of the main body casing 2. By opening the front cover 3, a process part 25 can be pulled out forward from the inside of the main body casing 2. A sheet output tray 5 on which a sheet 4 after image formation is mounted is formed on the top surface of the main body casing 2.

A sheet feeding tray 7 on which the sheet 4 for forming an image thereon is mounted is attached to a lower portion of the main body casing 2 so as to be pulled out forward. A sheet pressing plate 9 is provided in the sheet feeding tray 7 tiltingly so as to raise the front end of the sheet 4 by bias of a spring 8. Above the front end of the sheet feeding tray 7 are provided a pick-up roller 10 and a separating pad 11 which is pressed against the pick-up roller 10 by bias of a spring not shown. A pair of sheet feeding rollers 12 are provided diagonally to the upper front of the pick-up roller 10 and a pair of resist rollers 13 are provided above the sheet feeding rollers 12.

The uppermost sheet 4 on the sheet feeding tray 7 is pressed toward the pick-up roller 10 by the sheet pressing plate 9, and separated one by one by rotation of the pick-up roller 10 when being placed between the pick-up roller 10 and the separating pad 11. Then, the sheet 4 sent from between the pick-up roller 10 and the separating pad 11 is sent to the resist rollers 13 by the sheet feeding rollers 12. The resist rollers 13 send the sheet 4 to a rearward belt unit 15 at a predetermined timing.

The belt unit 15 can be attached/detached to/from the main body casing 2 and has a conveying belt 18 horizontally extended between a pair of belt supporting rollers 16 and 17 which are separated from each other in the front-back direction. The conveying belt 18 is an endless belt made of a resin material such as polycarbonate. By rotatingly driving the rear belt supporting rollers 17, the conveying belt 18 circulates in the counterclockwise direction in FIG. 1 to convey the sheet 4 mounted thereon rearward. On the inner side of the conveying belt 18, four transfer rollers 19 are arranged in the front-back direction at constant intervals with the conveying belt 18 being placed therebetween and disposed as opposed to photoconductive drums 31 of image forming units 26 described later respectively. At the time of transfer, transfer bias is applied between the transfer rollers 19 and the photoconductive drums 31.

A cleaning roller 21 for removing toner, paper powder and the like adhered to the conveying belt 18 is provided under the belt unit 15. The cleaning roller 21 is formed by wrapping a metal shaft member with a foam material made of silicon and faces a metal backup roller 22 provided in the belt unit 15 across the conveying belt 18. Predetermined bias is applied to between the cleaning roller 21 and the backup roller 22, thereby electrically sucking toner and the like on the conveying belt 18 toward the cleaning roller 21. A metal collecting roller 23 for removing the toner and the like adhered to the surface thereof is in contact with the cleaning roller 21. A blade 24 for scraping off the toner and the like adhered to the surface of the collecting roller 23 is in contact with the collecting roller 23.

A scanner unit 27 is provided in an upper portion of the main body casing, the process part 25 is provided below the scanner unit 27 and the belt unit 15 is provided on the lower side of the process part 25.

The scanner unit 27 irradiates a laser beam L of each color on the basis of predetermined image data to the surface of the corresponding photoconductive drum 31 at high speed. The configuration of the scanner unit 27 will be described later in detail.

The process part 25 has the four the image forming units 26 corresponding to colors of black (BK), cyan (C), magenta (M) and yellow (Y) which are arranged in the front-back direction. In this aspect, the image forming units 26 corresponding the colors of black, cyan, magenta and yellow are arranged in this order from the front side of the laser printer 1. Each image forming unit 26 has the photoconductive drum 31, a scorotron-type charger 32 and a developing cartridge 34. The process part 25 has a framework-like frame 29 having four cartridge attaching parts 30 arranged in the front-back directions. Each cartridge attaching parts 30 is opened to the upside and downside. The developing cartridge 34 can be attached/detached to/from the respective cartridge attaching part. The frame 29 holds each photoconductive drum 31 of the image forming unit 26 at the lower end of each cartridge attaching part 30 and further holds the scorotron-type charger 32 adjacent to the photoconductive drum 31.

The photoconductive drums 31 is formed by covering the surface of a grounded metal drum main unit with a positively-charged photoconductive layer made of polycarbonate or the like.

Each scorotron-type charger 32 is provided diagonally to the upper rear of the photoconductive drum 31 with a predetermined distance between them so as not to contact the photoconductive drums 31. The scorotron-type charger 32 is disposed as opposed to the photoconductive drum 31. The scorotron-type charger 32 generates corona discharge from a charging wire such as tungsten or the like, thereby positively-charging the surface of the photoconductive drums 31 in a uniform manner.

The developing cartridge 34 is substantially box-like. A toner storage chamber 38 is provided in an upper portion of the developing cartridge 34 and a feeding roller 39, a developing roller 40 and a thickness control blade 41 are provided below the toner storage chamber 38. The toner storage chambers 38 store positively-charged nonmagnetic one-component toner of black, cyan, magenta and yellow, respectively, therein. Each toner storage chamber 38 is provided with an agitator 42 for agitating the toner.

The feeding roller 39 is formed by covering a metal roller shaft with a conductive foam material and the developing roller 40 is formed by covering a metal roller shaft with a conductive rubber material. Toner emitted from the toner storage chamber 38 is supplied to the developing roller 40 by rotation of the feeding roller 39 and positively frictionally-charged between the feeding roller 39 and the developing roller 40. Then, with rotation of the developing roller 40, the toner supplied on the developing roller enters between the thickness control blade 41 and the developing roller 40, frictionally charged more sufficiently therein and carried on the developing roller 40 as a thin layer having a certain thickness.

During rotation, the surface of each photoconductive drum 31 is positively charged by the scorotron-type charger 32 in a uniform manner. Then, the surface is exposed by high-speed scanning of the laser beam emitted from the scanner unit 27 to form an electrostatic latent image corresponding to an image to be formed on the sheet 4.

Next, when the positively-charged toner carried on the developing roller 40 by rotation of the developing roller 40 contacts the photoconductive drums 31 in an opposed manner, the toner is fed to the electrostatic latent image formed on the surface of the photoconductive drum 31. Thereby, the electrostatic latent image on the photoconductive drums 31 is made visible and a toner image is carried only on the exposed region of the surface of the photoconductive drums 31.

After that, while the sheet 4 conveyed by the conveying belt 18 passes transfer positions between the photoconductive drums 31 and the transfer rollers 19, the toner images carried on the surfaces the photoconductive drums 31 are sequentially transferred on the sheet 4 by negative transfer bias applied to the transfer rollers 19. The sheet 4 on which the toner images are transferred in this manner is conveyed to a fixing unit 43.

The fixing unit 43 is disposed in the rear of the conveying belt 18 in the main body casing 2. The fixing unit 43 includes a heating roller 44 which has a heat source such as a halogen lamp and is rotationally driven and a pressing roller 45 which is disposed under the heating roller 44 as opposed to each other so as to press the heating roller 44 and rotated following rotation of the heating roller 44. In the fixing unit 43, by conveying the sheet 4 which carries the toner-image of four colors thereon between the heating roller 44 and the pressing roller 45 while heating the sheet 4, the toner image is fixed on the sheet 4. The thermally fixed sheet 4 is conveyed to sheet discharge rollers 47 provided in the upper portion of the main body casing 2 by a conveying roller 46 disposed diagonally to the upper rear of the fixing unit 43 and then discharged to the sheet output tray 5 by the sheet discharge rollers 47.

(Configuration of Scanner Unit)

Figure 2:
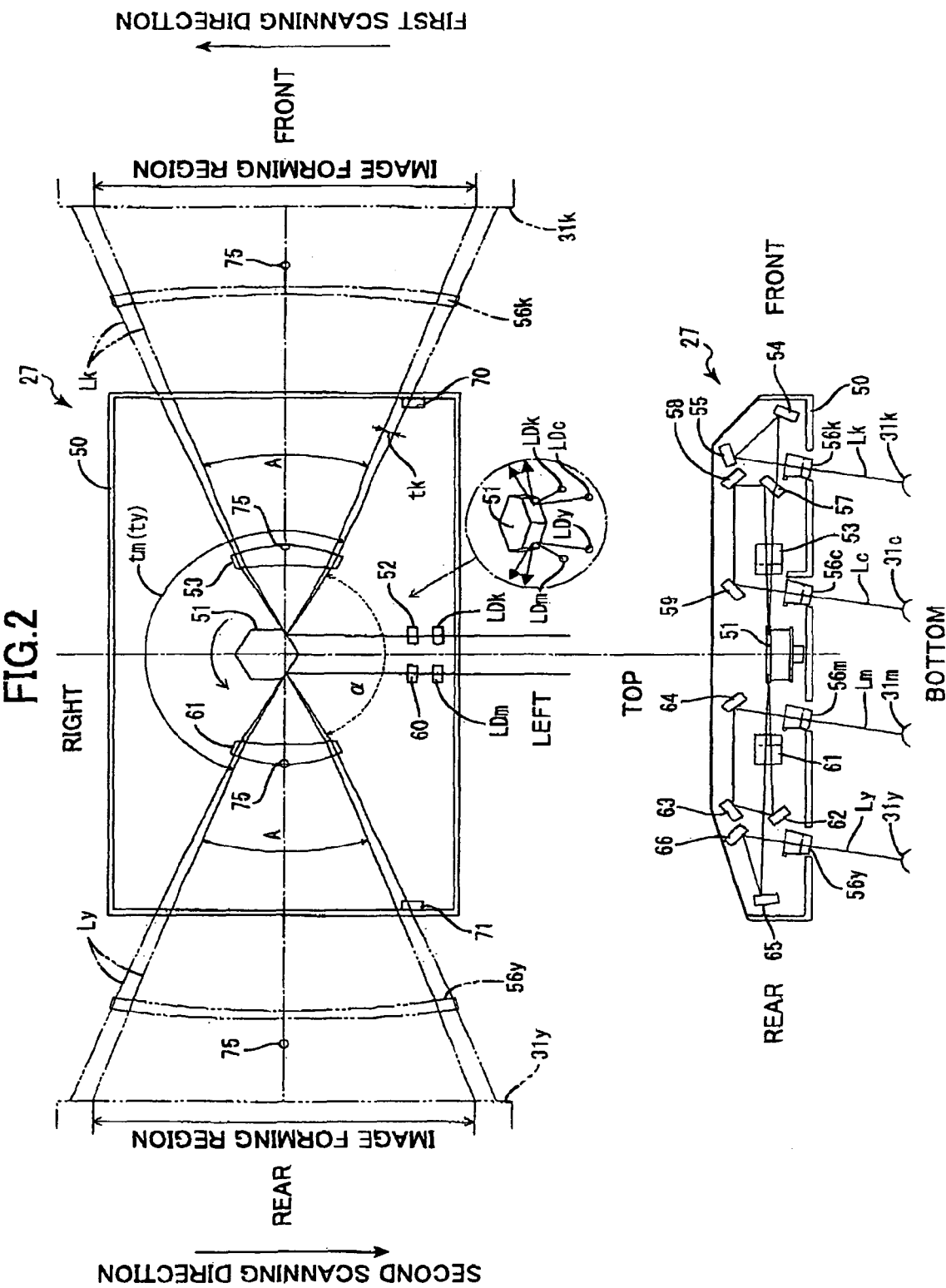
FIG. 2 are schematic views for describing the configuration of a scanner unit.

FIG. 2 is a schematic view for describing the scanner unit 27. In FIG. 2, the right side is the front side of the laser printer 1, and the sheet 4 is conveyed from the right to the left in the figures by the belt unit 15. That is, the direction toward the left from the right is the conveyance direction of the sheet 4 and the sub scanning direction on the photoconductive drums 31. The lower view is a left side (the near side of the sheet in FIG. 1) sectional view of the scanner unit 27, and the upper view is a view of the inside of the scanner unit 27 (each reflecting mirror is omitted) when viewed from above (from the top to bottom of the sheet in FIG. 1). The upper view shows optical paths of laser beam Lk and Ly that are optically equivalent to optical paths in the lower view. Note that the laser beam Lk and Ly are expanded without being reflected by respective reflecting mirrors in the upper view.

As shown in FIG. 2, the scanner unit 27 is provided with a box-like resin housing 50 and a polygon mirror 51, for example, having a shape of a hexahedron and rotatably provided in substantially center of the housing so (rotationally driven in the counterclockwise direction in upper view of FIG. 2). The housing 50 is provided with four laser beam sources, more specifically, laser diodes (hereinafter referred to as "LDk, LDc, LDm and LDy") in the vicinity of the right side of the polygon mirror 51.

Laser diode LDk is disposed diagonally above the polygon mirror 51, and emits a laser beam Lk modulated on the basis of image data of black S1 to a deflection surface of the polygon mirror 51 through a cylindrical lens 52. The laser beam Lk is deflected by the polygon mirror 51, is guided to the front side of the laser printer 1, passes through a first scanning lens 53 (for example, fθ lens), is turned rearward by a reflecting mirror 54, is further turned downward by a reflecting mirror 55, passes through a second scanning lens 56$k$ (for example, toxic lens) and is irradiated on the surface of a photoconductive drum 31$k$ of an image forming unit 26$k$ for black. By rotation of the polygon mirror 51, the laser beam Lk scans the surface of the photoconductive drum 31$k$ from left to right (the upward direction in the upper view of FIG. 2; hereinafter referred to as a "first scanning direction") at high speed.

Laser diode LDc is disposed below the laser diode LDk and diagonally below the polygon mirror 51, and emits a laser beam Lc modulated on the basis of image data of cyan S1 to the deflection surface of the polygon mirror 51 (the same deflection surface as that for the laser diode LDk) through the cylindrical lens 52. The laser beam Lc is deflected by the same deflection surface as in the laser beam Lk, is guided to the front side of the laser printer 1, passes through the first scanning lens 53, is turned rearward by reflecting mirrors 57 and 58, is further turned downward by a reflecting mirror 59, passes through a second scanning lens 56$c$ and is irradiated on the surface of a photoconductive drum 31$c$ of an image forming unit 26$c$ for cyan. By rotation of the polygon mirror 51, the laser beam Lc scans the surface of the photoconductive drum 31$c$ in the first scanning direction at high speed.

Laser diode LDm is disposed alongside in the rear of the laser diode LDk, emits a laser beam Lm modulated on the basis of image data of magenta S1 to a deflection surface of the polygon mirror 51 (a deflection surface adjacent the deflection surface to which the laser diodes LDk and LDc point) through a cylindrical lens 60. The laser beam Lm is deflected by the polygon mirror 51, is guided to the rear side of the laser printer 1 (the substantially opposite direction to that in LDk and LDc), passes through a first scanning lens 61, is turned forward by reflecting mirrors 62 and 63, is further turned downward by a reflecting mirror 64, passes through a second scanning lens 56$m$ and is irradiated on the surface of a photoconductive drum 31$m$ of an image forming unit 26$m$ for magenta. By rotation of the polygon mirror 51, the laser beam Lm scans the surface of the photoconductive drum 31$m$ from right to left (the downward direction in the upper view of FIG. 2; hereinafter referred to as a "second scanning direction") at high speed.

Laser diode LDy is disposed alongside in the rear of the laser diode LDc and below the laser diode LDm, and emits a laser beam Ly modulated on the basis of image data of yellow S1 to the deflection surface of the polygon mirror 51 (the same deflection surface as that for the laser diode LDm) through the cylindrical lens 52. The laser beam Ly is deflected by the same deflection surface as in the laser beam Lm, is guided to the rear side of the laser printer 1, passes through the first scanning lens 53, is turned rearward by a reflecting mirror 65, is further turned downward by a reflecting mirror 66, passes through a second scanning lens 56$y$ and is irradiated on the surface of a photoconductive drum 31$y$ of an image forming unit 26$y$ for yellow. By rotation of the polygon mirror 51, the laser beam Ly scans the surface of the photoconductive drum 31$y$ in the second scanning direction at high speed. The above-mentioned first scanning lenses 53 and 61, second scanning lenses 56$k$, 56$c$, 56$m$, 56$y$, reflecting mirrors 54, 55, 57 to 59 and 62 to 66 are fixedly supported in the housing 50.

A first BD (Beam Detect) sensor 70 is disposed at the left end of the front inner wall surface of the housing 50, and a second BD sensor 71 is disposed at the left end of the rear inner wall surface of the housing 50. The first BD sensor 70 can receive the laser beam Lk, and output a first BD signal S3 when receiving the laser beam Lk. As described later, using this first light-receiving timing as a reference, scanning start timing (at which writing in the main scanning direction starts) of the laser beams Lc, Lm and Ly as well as the laser beam Lk to the respective photoconductive drums 31 is determined. The second BD sensor 71 also can receive the laser beam, and output a second BD signal S4 when receiving the laser beam.

Figure 3:
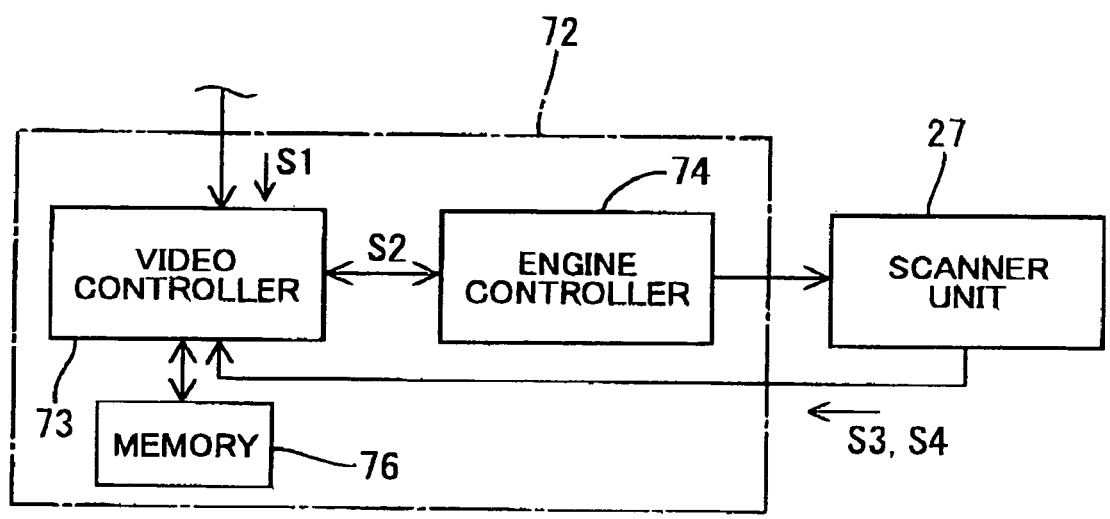
FIG. 3 is a block diagram of a control unit for controlling the scanner unit.

FIG. 3 is a block diagram of a control unit 72 for controlling the scanner unit 27. The control unit 72 has a video controller 73 and an engine controller 74. The video controller 73 receives the image data S1 from, for example, a terminal device (not shown) communicatively connected to the laser printer 1 and expands the image data into bit map data to generate a video signal S2 for image formation. The video controller 73 also receives the first BD signal S3 outputted from the first BD sensor 70, and the second BD signal S4 outputted from the second BD sensor 71.

The video controller 73 and the engine controller 74 can transmit/receive information serially. In response to the video signal S2 sent from the video controller 73, the engine controller 74 drives the laser diodes LDk, LDc, LDm, and LDy corresponding colors of the scanner unit 27, respectively.

Figure 4:
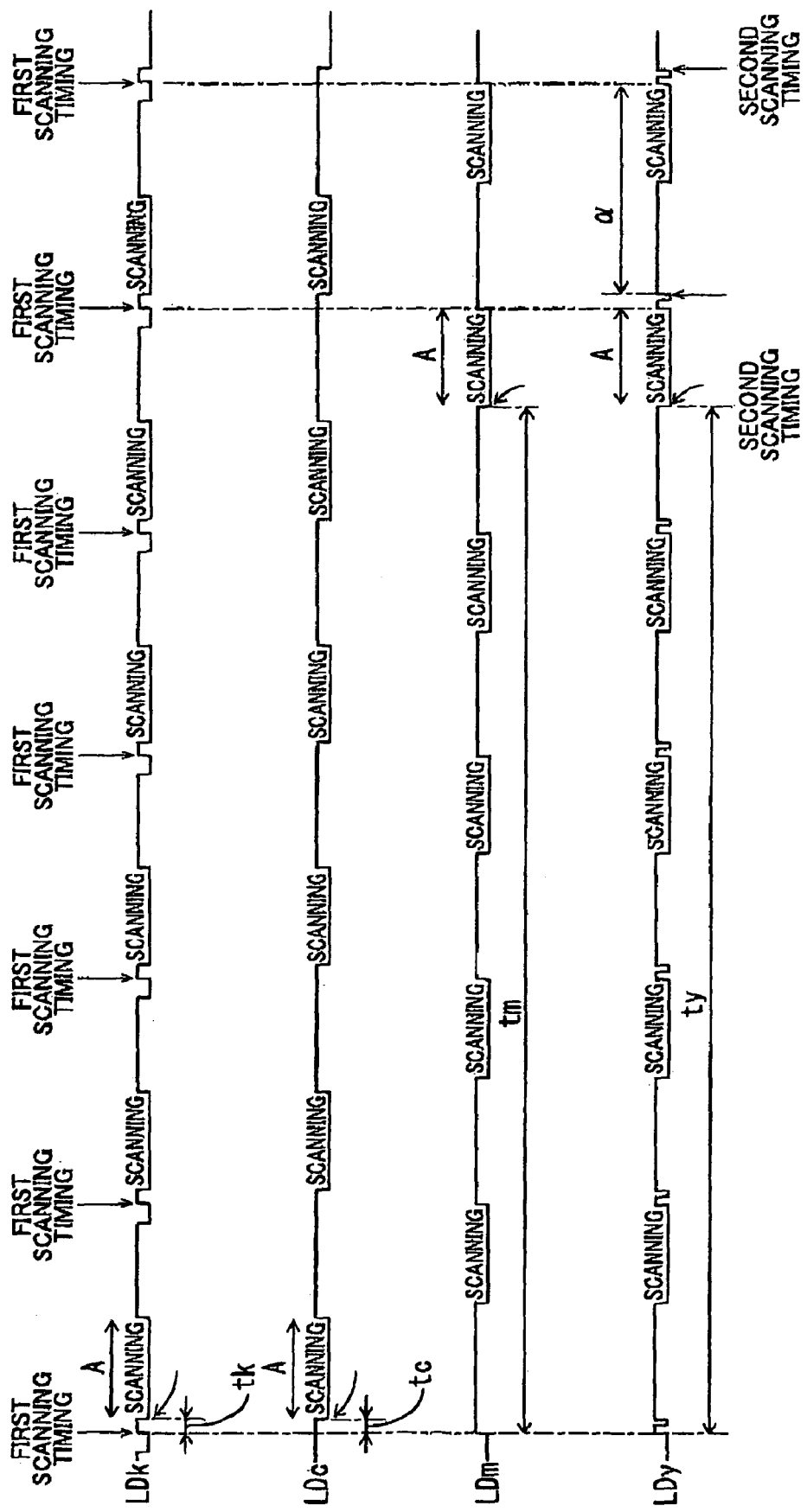
FIG. 4 shows time charts showing driving of LDk to LDy controlled by a control unit.

FIG. 4 shows time chart showing driving of the laser diodes LDk, LDc, LDm, and, LDy by the control unit 72. In high level, each laser diode LD is an OFF state, and in low level, each laser diode LD is an ON state in which the laser beam is emitted in accordance with the control by the controller 74.

In FIG. 4, the top one is a time chart on the laser diode LDk. The control unit 72 temporarily drives the laser diode LDk to emit the laser beam Lk immediately before one deflection surface of the polygon mirror 51 is positioned at a scanning starting position at which one deflection surface of the polygon mirror 51 deflects the laser beam Lk to start scanning the photoconductive drum 31$k$ for 1 line. The first BD sensor 70 receives the temporarily emitted laser beam Lk, and outputs the first BD signal S3 when receiving the laser beam Lk. Hereinafter, the timing when the first BD sensor 70 receives the temporarily emitted laser beam Lk is called as a first light-receiving timing. The video controller 73 receives the first BD signal S3, and recognizes the first light-receiving timing.

After a lapse of black BD time tk from the first light-receiving timing, the video controller 73 gives the black image data (video signal) S2 to the engine controller 74 to control the laser diode LDk so as to output the laser beam Lk modulated on the basis of the black image data S2. Thereby, the laser beam Lk performs scanning the photoconductive drum 31$k$ for 1 line (exposure) for a predetermined time A, while securing a blank region according to the black BD time tk. And then, the laser diode LDk is turned OFF. After each time each of the deflection surfaces of the polygon mirror 51 is positioned at the scanning starting position, the above-mentioned series of operations are repeated to sequentially perform scanning the photoconductive drum 31$k$ for each line. With such configuration, as long as the temperature in the scanner unit 27 falls within a predetermined range, the laser beam Lk starts scanning the photoconductive drum 31$k$ from a write start position inner than the left end with a predetermined width Xk of the photoconductive drum 31$k$ in the main scanning direction.

In FIG. 4, the second one from the top is a time chart on the laser diode LDc. As in the case of the laser diode LDk, the control unit 72 controls the laser diode LDc so that the laser beam Lc modulated on the basis of image data S2 of cyan starts scanning the photoconductive drum 31$c$ after a lapse of cyan BD time tc (=tk) from the first light-receiving timing. Thereby, the laser beam Lc performs scanning the photosensitive drum 31$c$ for 1 line for the predetermined time A, while securing a blank region according to the cyan BD time tc. And then, the laser diode LDc is turned OFF. After each time each of the deflection surfaces of the polygon mirror 51 is positioned at the scanning starting position, the above-mentioned series of operations are repeated to sequentially perform scanning the photoconductive drum 31$c$ for each line. With such configuration, as long as the temperature in the scanner unit 27 falls within a predetermined range, the laser beam Lc starts scanning the photoconductive drum 31$c$ from a write start position inner than the left end with a predetermined width Xc of the photoconductive drum 31$c$ in the first scanning direction.

In FIG. 4, the third one from the top is a time chart on the laser diode LDm. The control unit 72 controls the laser diode LDm so that the laser beam Lm modulated on the basis of image data S2 of magenta starts scanning the photoconductive drum 31$m$ after a lapse of magenta BD time tm (>tc) from the first light-receiving timing. Thereby, the laser beam Lm performs scanning the photoconductive drum 31$m$ for 1 line for the predetermined time A, while securing a blank region according to the magenta BD time tm. And then, the laser diode LDm is turned OFF. After each time each of the deflection surfaces of the polygon mirror 51 is positioned at the scanning starting position, the above-mentioned series of operations are repeated to sequentially perform scanning the photoconductive drum 31$m$ for each line. With such configuration, as long as the temperature in the scanner unit 27 falls within a predetermined range, the laser beam Lm starts scanning the photoconductive drum 31$m$ from a write start position inner than the right end with a predetermined width Xm of the photoconductive drum 31m in the second scanning direction.

In FIG. 4, the fourth one from the top is a time chart on LDy. As in the case of the laser diode LDm, the control unit 72 controls the laser diode LDy so that the laser beam Ly modulated on the basis of image data S2 of yellow starts scanning the photoconductive drum 31y after a lapse of yellow BD time ty (=tm) from the first light-receiving timing. Thereby, the laser beam Ly performs scanning the photoconductive drum 31y for 1 line for the predetermined time A, whiling securing a blank region according to the yellow BD time tm. And then, the laser diode LDy is turned OFF. After each time each of the deflection surfaces of the polygon mirror 51 is positioned at the scanning starting position, the above-mentioned series of operations are repeated to sequentially perform scanning the photoconductive drum 31y for each line. With such configuration, as long as the temperature in the scanner unit 27 falls within a predetermined range, the laser beam Lm starts scanning the photoconductive drum 31y from a write start position inner than the right end with a predetermined width Xy of the photoconductive drum 31y in the second scanning direction.

Further, the control unit 72 temporarily drives the laser diodes LD to emit the laser beam L immediately after one deflection surface of the polygon mirror 51 is positioned at a scanning ending position at which one deflection surface of the polygon mirror 51 deflects the laser beam L to end scanning the photoconductive drum 31 for 1 line. The second BD sensor 71 receives the temporarily emitted laser beam L, and outputs the second BD signal. S4 when receiving the laser beam L. Hereinafter, the timing when the second BD sensor 71 receives the temporarily emitted laser beam L is called as a second light-receiving timing. The video controller 73 receives the second BD signal S4, and recognizes the second light-receiving timing.

In this aspect, the magenta BD time tm and the yellow BD time ty are set as time obtained by adding the black. BD time tk to 4 or 5 times of period from one first light-receiving timing to next first light-receiving timing. Further, in this aspect, the black BD time tk and the cyan BD time tc are set as the same time, and the magenta BD time tm and the yellow BD time ty are set as the same time under certain temperatures.

With the above-mentioned configuration, the laser printer 1 can make the write start positions of electrostatic latent images of black, cyan, magenta and yellow in the main scanning direction uniform, thereby transferring a color image without color shift on the sheet 5.

(Influence of Temperature and Countermeasures)

Generally, in the laser printer, the temperature in the scanner unit varies due to heat that the fixing unit and rotational driving of the polygon mirror generate. This temperature variation causes expansion and contraction of the housing, resulting in movement of the BD sensors in the cross direction and a change in magnification of scanning lenses. In this case, since the first light-receiving timing at the first BD sensor is advanced or delayed, the write start positions in the main scanning direction on the photoconductive drums by the laser beams shift from side to side. As a result, color shift occurs.

Therefore, the inventor carried out the following experiment. First, the inventor placed a plurality of (in this aspect, four) temperature sensors 75 in the scanner unit 27 with a distance therebetween along the front-back direction. More specifically, the temperature sensors 75 are placed in the vicinity of first scanning lenses 53 and 61, second scanning lenses 56k and 56y, respectively. Then, the inventor actuated the laser printer 1 and plotted relationship between detection temperature T of each temperature sensor 75 and detection time difference α. Here, the detection time difference α represents time difference between the first light-receiving timing and the second light-receiving timing (in this aspect, time from the second light-receiving timing to the next first light-receiving timing).

Figure 5:
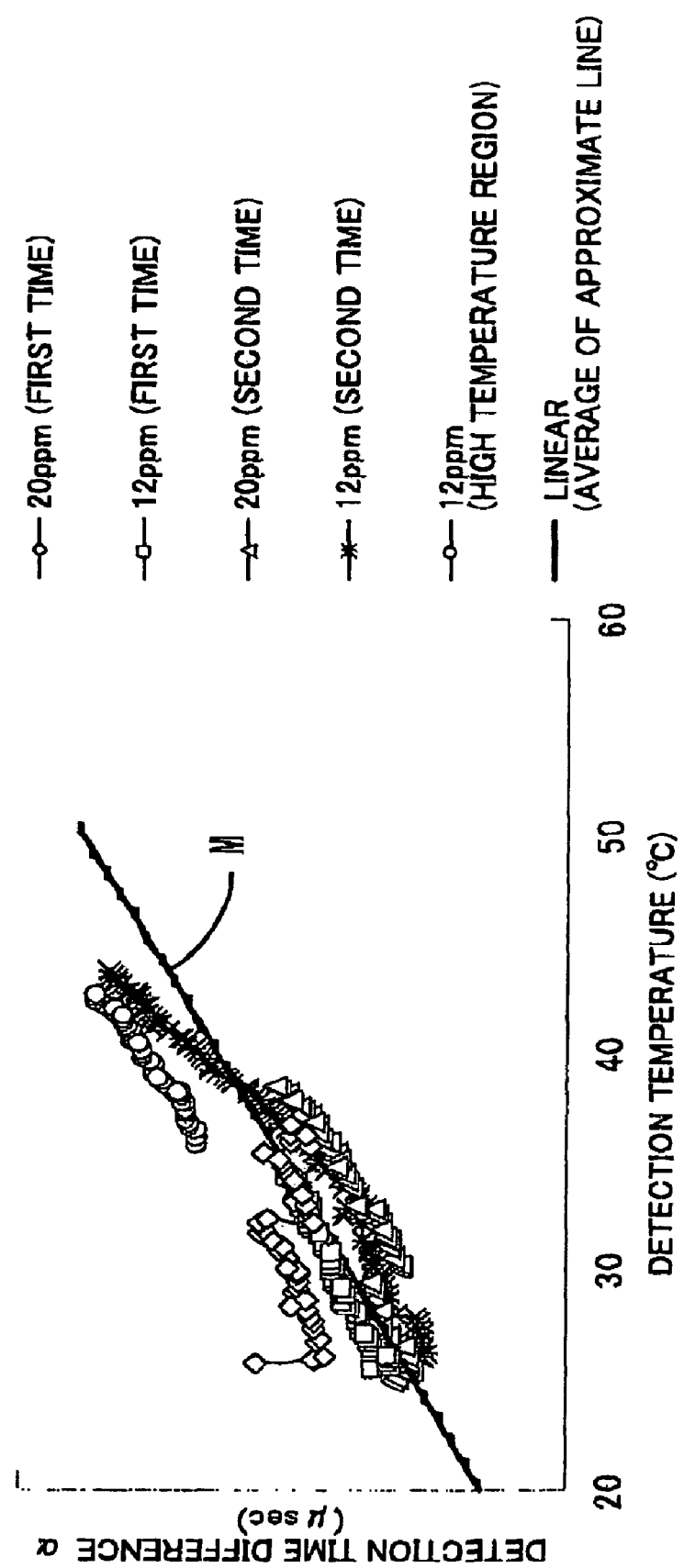
FIG. 5 is a graph showing experiment results on relationship between detection temperature of a temperature sensor and detection time difference.

FIG. 5 is a plot of results on relationship between the detection temperature T of the temperature sensor 75 placed in the vicinity of the first scanning lens 61 near the fixing unit 43 and the detection time difference α. In this experiment, printing was performed twice under each of conditions of 20 ppm, 500 sheets and 12 ppm, 500 sheets, and once under a condition of 12 ppm, 500 sheets in high temperatures (about 40° C.). The plot results demonstrate that a certain extent of linearity exists between the detection temperature T of the temperature sensor 75 and the detection time difference α. Thus, a first function (α=p·T+q; p, q: constant number) corresponding to a linearly approximate line M was derived from the plot results by using a least square method or other methods. The reason why the temperature sensor 75 near the first scanning lens 61 was selected was that the relationship between the detection temperature T and the detection time difference α has the higher linearity in comparison with the other temperature sensors 75.

Figure 6:
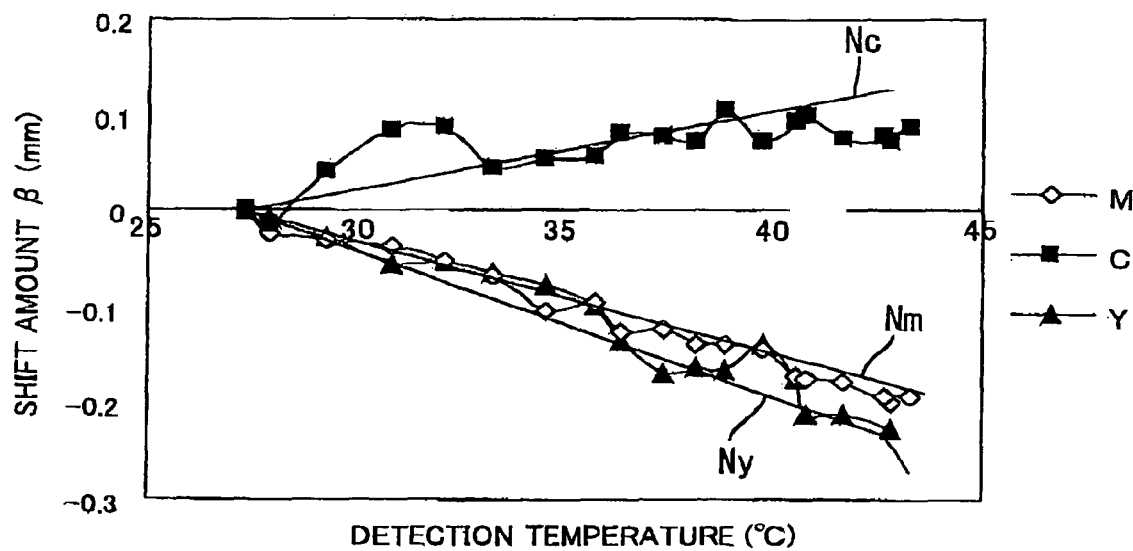
FIG. 6 is a graph showing experiment results on relationship between detection temperature of a temperature sensor and shift amount of write start position.

Next, shift amounts β of the write start positions on the photoconductive drum 31 by the other laser beams Lc, Lm, and Ly, with respect to the detection temperature T of the temperature sensor 75 near the first scanning lens 61 and the write start position on the photoconductive drum 31k by the laser beam Lk, were measured by use of a microscope. FIG. 6 shows the results. Leftward shift with respect to the write start position by the laser beam Lk is represented as positive shift in FIG. 6. The plot results demonstrate that a certain extent of linearity exists between each of the shift amounts β for cyan, magenta and yellow and the detection temperature T. Thus, second functions (β=1·T+s; r, s: constant number) corresponding to linearly approximate lines Nc, Nm, Ny of cyan, magenta and yellow, respectively, between the shift amounts β and the detection temperature T were derived.

Figure 7:
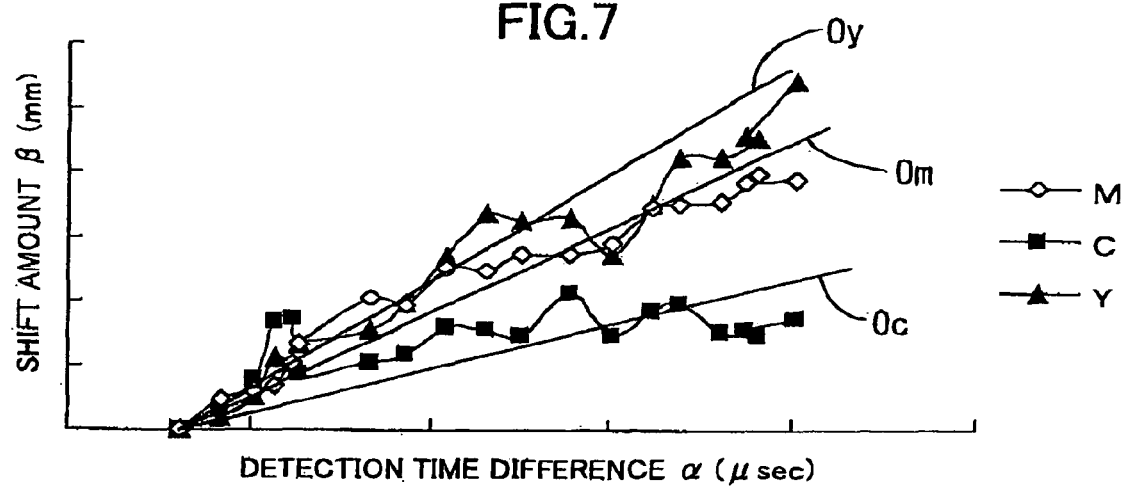
FIG. 7 is a graph showing experiment results on relationship between detection time difference and shift amount of write start position.
Figure 8:
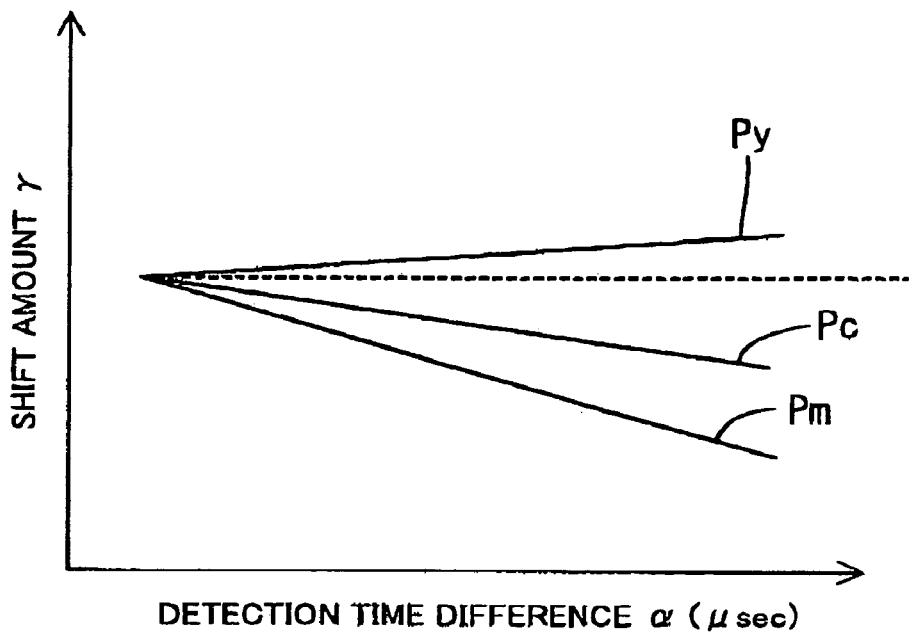
FIG. 8 is a graph showing experiment results on relationship between detection time difference and shift amount of scanning width in another illustrative aspect.

By deleting the detection temperature T from the first function and the second functions thus obtained, linearly third functions (β=u·α+v u, V: constant number) of the detection time difference α and the shift amounts β can be obtained. Alternatively, the third functions may be obtained as follows: by substituting the plot results in FIG. 6 for the first function, plot results shown in FIG. 7 are obtained and approximate lines Oc, Om, Oy of cyan, magenta and yellow, respectively, are derived.

In this manner, the relationship between the detection time difference α and the shift amounts β that reflects influence of temperature variation can be obtained as the linearly third functions. Accordingly, by substituting the actually detected detection time difference α into the third functions, the shift amounts β in the main scanning direction of cyan, magenta and yellow with respect to black can be found without detecting temperature by the temperature sensors 75 each time.

In this aspect, the control unit 72 has a memory 76. The memory 76 stores a correspondence table of the detection time difference α and the shift amounts β that correspond to the third function therein. The shift amounts β may be shift amount itself of the write start positions with respect to black or shift time obtained by dividing the shift amounts β by scanning speed of each laser bean determined by rotational speed of the polygon mirror 51. The video controller 73 detects the detection time difference α between the second light-receiving timing of the second BD signal S4 and the first light-receiving timing of the first BD signal S3: constantly. Then, the video controller 73 reads the shift amounts β of cyan, magenta and yellow that correspond to the actually detected detection time difference α from the correspondence table, and outputs each video signal S2 to the engine controller 74 at the timing when the BD time tc, tm and ty are corrected so as to offset the shift amounts β.

(Effects of this Aspect)

In this aspect, in consideration with temperature variation in the scanner unit 27, linear relationship (third functions) between the detection time difference α between the first light-receiving timing of the first BD sensor 70 and the second light-receiving timing of the second BD sensor 71, and the shift amounts β of cyan, magenta and yellow with respect to the black latent image is experimentally obtained in advance. On basis of the relationship, the shift amounts β corresponding to the actually detected detection time difference α are estimated and the scanning start timings of cyan, magenta and yellow are corrected so as to offset the shift amounts β. Thus, it is unnecessary for the laser printer 1 to install the temperature sensor provided in the conventional configuration.

Moreover, the first BD sensor 70 for arranging the scanning start timing of each laser beam L is used as an optical detecting sensor for detecting the detection time difference α, thereby reducing the number of used sensors.

In this aspect, the shift amounts β of cyan, magenta and yellow with respect to the black latent image are estimated and only the write start positions of cyan, magenta and yellow images are corrected. With this configuration, it is impossible to correct the write start position of the black latent image if the write start position of the black latent image may also shift due to temperature variation. However, since the write start positions of the other cyan, magenta and yellow images are corrected using the black image as a reference, color shift as a whole can be prevented and the loads of correction processing can be reduced.

In the scanner unit 27, the first BD sensor 70 and the second BD sensor 71 are disposed on the same end side in the main scanning direction and at the front and rear ends in the sub scanning direction. Thus, even when temperature distribution in the scanner unit 27 varies between the closer side to the fixing unit 43 and the further side from the fixing unit 43, influence on the whole scanner unit 27 by temperature variation can be reflected to correspondence information and correction can be made on the basis of the information In this aspect, the plurality of LDs, the polygon mirror 51, the first scanning lenses 53 and 61, second scanning lenses 56k, 56c, 56m, 56y, reflecting mirrors 54, 55, 57-59 and 62-66, the first BD sensor 70 and the second BD sensor 71 are provided at the housing 50 commonly. Thus, this configuration enables obtaining correspondence information closer to linearity.

Correspondence information, instead of the correspondence table, may be stored in the memory 76. However, when the correspondence information is represented as the correspondence table, calculation time can be reduced, enabling high-speed processing.

<Second Aspect>

In the first aspect, color shift based on variation in write start positions of the laser beams L for the colors due to temperature variation is corrected. In a second aspect, color shift based on variation in scanning width (the width of the image forming region in the main scanning direction) on the photoconductive drums 31 of the laser beams L for the colors due to temperature variation is also corrected. The same elements as those in the first aspect are given the same reference numerals and description thereof is omitted. Only differences will be described below.

As described above, in the laser printer 1, the temperature in the scanner unit 27 varies due to heat generation of the fixing unit 43 and heat generation caused by rotational driving of the polygon mirror 51. This temperature variation causes a change in magnification of the scanning lenses 63, 61 and 56. Thus, scanning widths of the laser beams to the corresponding photoconductive drums 31 vary, thereby generating color shift.

Here, using the detection temperature T of the temperature sensor 75 near the first scanning lens 61 and the scanning width of the laser beam Lk on the photoconductive drum 31k as references, shift amounts γ of the scanning widths of the other laser beams Lc, Lm, and Ly on the photoconductive drums 31 were measured by use of a microscope. Like the relationship between the detection temperature T and the shift amounts β of the write start positions of the laser beams Lc, Lm, and Ly on the photoconductive drums 31 in the first aspect, there was a certain extent of linearity between the shift amounts γ of cyan, magenta and yellow and the detection temperature T. Then, fourth functions corresponding to linearly approximate lines of cyan, magenta and yellow, respectively, between the shift amounts γ and the detection temperature T were derived. By deleting the detection temperature T from the first function and the fourth functions thus obtained, linearly fifth functions Pc, Pm, Py ($\gamma=u\cdot\alpha+v$; u, v: constant number) of the detection time difference α and the shift amounts γ can be obtained.

In this manner, the relationship between the detection time difference α and the shift amounts γ that reflects influence of temperature variation can be obtained as the linearly fifth functions. Accordingly, when the fifth functions are used and actual detection time difference α is detected, the shift amounts γ of the scanning width of cyan, magenta and yellow with respect to black can be found without detecting temperature by the temperature sensors 75 each time.

The memory 76 of the control unit 72 stores a correspondence table between the detection time difference α and the shift amounts γ that correspond to the fifth functions therein. The video controller 73 detects the detection time difference α between the second light-receiving timing of the second BD signal S4 and the first light-receiving timing of the first BD signal S3 constantly. Then, the video controller 73 reads the shift amounts γ of cyan, magenta and yellow which correspond the actually detected detection time difference α from the correspondence table, corrects image data of cyan, magenta and yellow so as to offset the shift amounts γ and outputs the corrected data to the engine controller 74 as the video signal S2.

Specifically, even if there is no temperature variation, when each LD is driven on the basis of the each color image data received by the video controller 73 and each laser beam L scans the corresponding photoconductive drum 31, there actually causes variation in the scanning width of each laser beam L on the photoconductive drum 31. In this aspect, the number of dots formed by pulse driving during scanning of 1 line by LDc, LDm and LDy is previously adjusted so as to correspond to the black laser beam Lk having the shortest scanning width. More specifically, the scanning width of each color is divided into a plurality of sections (for example, four) and the number of dots is previously subtracted so that the scanning width of black may be equal to the scanning width of cyan, magenta and yellow in each divided section.

Figure 9:
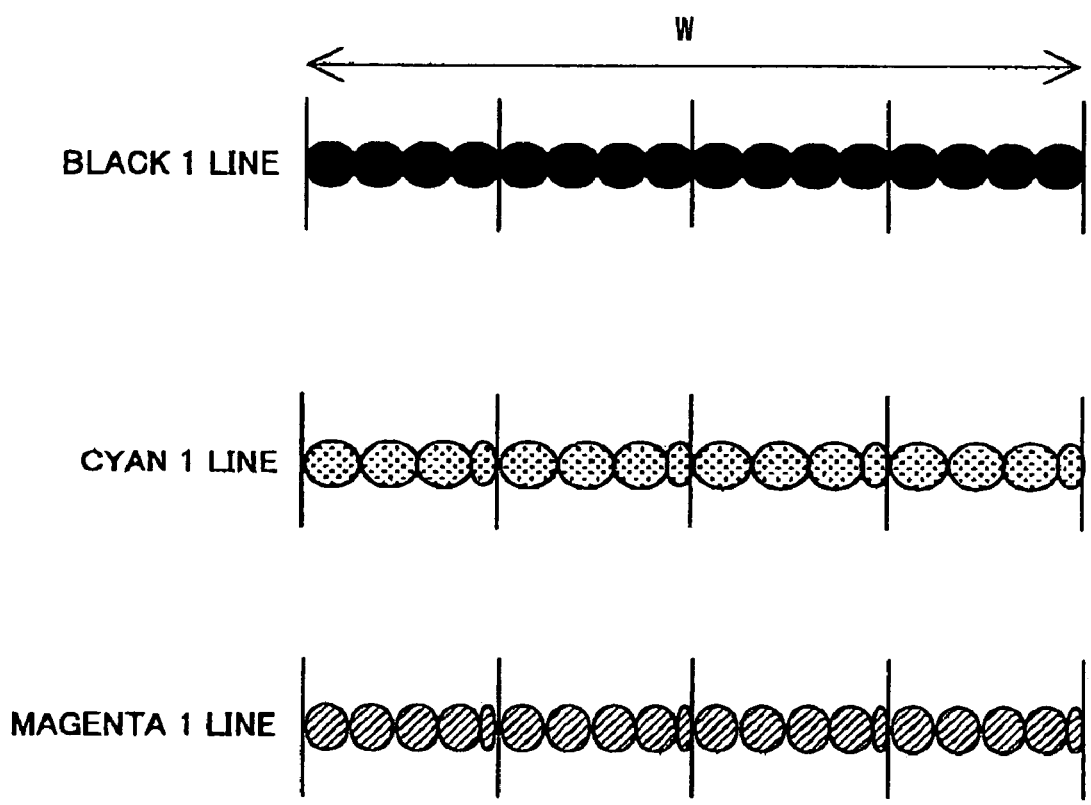
FIG. 9 is a schematic view for describing correction processing of the scanning width (laser generating means).

For example, as shown in FIG. 9, a dot of, for example, 600 dpi is sequentially formed by the black laser beam Lk to constitute a scanning width W (refer to the top view in FIG. 9). In the case where it is estimated that the scanning width of the cyan laser beam Lc on the photoconductive drum 31c is larger by the shift amount γ than the scanning width of the black laser beam Lk, the video controller 73 reduces a dot spacing of the cyan laser beam Lc in each divided section, for example, in quarters of 600 dpi so as to correspond to the scanning width of black (refer to the second view in FIG. 9). On the contrary, in the case where it is estimated that the scanning width of the magenta laser beam Lm on the photoconductive drum 31m is smaller by the shift amount γ, the video controller 73 increases a dot spacing of the magenta laser beam Lm in each divided section, for example, in quarters of 600 dpi using the above-mentioned cut dots so as to correspond to the scanning width of black (refer to the third view in FIG. 9).

In consideration with temperature variation in the scanner unit 27, linear relationship (fifth functions) between the detection time difference α of the first BD sensor 70 and the second BD sensor 71, and the shift amounts γ of the scanning widths of cyan, magenta and yellow with respect to the black latent image is experimentally obtained in advance. On basis of the relationship, the shift amounts γ corresponding to the actually detected detection time difference α are estimated and the scanning start timings of cyan, magenta and yellow are corrected so as to offset the shift amounts γ. Thus, it is unnecessary to install the is temperature sensor provided in the conventional configuration. Furthermore, it is unnecessary to individually provide the optical detecting sensor at a scanning start end and a scanning termination end of each laser beam as in the conventional art.

<Third Aspect>

The first aspect has the configuration in which color shift based on variation in write start positions of the laser beams L for the colors due to temperature variation is corrected. In addition to the configuration in the first and second aspect, a third aspect has the configuration in which color shift based on variation in scanning positions of the laser beams L on the photoconductive drums 31 in the sub scanning direction is also corrected. The same elements as those in the first and second aspects are given the same reference numerals and description thereof is omitted. Only differences will be described below.

Temperature variation in the scanner unit 27 may cause shift in reflection angles of the reflecting mirrors 54 and 55 supported by the resin housing 50. As a result, scanning positions of the laser beams L on the photoconductive drums 31 in the sub scanning direction vary, thereby generating color shift.

Here, using the detection temperature T of the temperature sensor 75 near the first scanning lens 61 and the scanning position of the laser beam Lk on the photoconductive drum 31k in the sub scanning direction as references, shift amounts ρ of the scanning position of the other laser beams Lc to Ly on the photoconductive drums 31 in the sub scanning direction were measured by use of a microscope. Like the relationship between the detection temperature T and the shift amounts β of the write start positions of the laser beams Lc to Ly on the photoconductive drums 31 in the first aspect, there was a certain extent of linearity between the shift amounts ρ of cyan, magenta and yellow and the detection temperature T. Then, sixth functions corresponding to linearly approximate lines of cyan, magenta and yellow, respectively, between the shift amounts ρ and the detection temperature T were derived. By deleting the detection temperature T from the first function and the sixth functions thus obtained, linearly seventh functions (not shown) of the time difference α and the shift amounts ρ can be obtained.

In this manner, the relationship between the detection time difference α and the shift amounts ρ which reflects influence of temperature variation can be obtained as the linearly seventh functions. Accordingly, when the seventh functions are used and actual detection time difference α is detected, the shift amounts ρ of the scanning positions of cyan, magenta and yellow with respect to black in the sub scanning direction can be found without detecting temperature by the temperature sensors 75 each time.

The memory 76 of the control unit 72 stores a correspondence table between the detection time difference α and the shift amounts ρ which correspond to the seventh functions therein. The video controller 73 detects the detection time difference α between the second light-receiving timing of the second BD signal S4 and the first light-receiving timing of the first BD signal S3 constantly. Then, the video controller 73 reads the shift amounts ρ of cyan, magenta and yellow which correspond the actually detected detection time difference α from the correspondence table and advances or delays the scanning start timings of LDc, LDm and LDy by arbitrary lines (integral multiples of a rotational cycle of the polygon mirror 51) so as to offset the shift amounts ρ.

In consideration with temperature variation in the scanner unit 27, linear relationship (seventh functions) between the detection time difference α of the first BD sensor 70 and the second BD sensor 71, and the shift amounts ρ of the scanning positions of cyan, magenta and yellow with respect to the black latent image in the sub scanning direction is experimentally obtained in advances. On basis of the relationship, the shift amounts ρ corresponding to the actually detected detection time difference α are estimated and the scanning start timings of cyan, magenta and yellow are corrected so as to offset the shift amounts ρ. Thus, it is unnecessary to install the temperature sensor.

<Other Aspects>

While the invention has been described in detail with reference to the above aspects thereof, it would be apparent to those skilled in the art that various changes and modifications may be made therein without departing from the spirit of the invention.

(1) In the above-described aspects, the present invention is applied to the direct transfer tandem-type color laser printer of directly transferring developer images carried on the photoconductive drums 31 for the colors on the sheet 4. However, when the present invention is applied to an intermediate transfer tandem-type printer of temporarily transferring the developer images carried on the photoconductive drums 31 on an intermediate transfer member or an intermediate transfer belt and then transferring the images on the sheet, the similar effects can be obtained. Further, the present invention may be applied to a fax machine and a compound machine having various functions such as a printing function and a scanning function as well as a printer (for example, a laser printer).

(2) In each of the above-described aspects, the correspondence table between the detection time difference α and the shift amounts which corresponds to the third, fifth or seventh functions is stored in the memory 76. However, the following configuration may be adopted: the third functions is stored in the memory 76 and the shift amounts corresponding to actually detected detection time difference α are calculated by substituting the actually detected detection time difference α for the third functions.

(3) In the above-described aspects, using the write start position of one of a plurality of colors (black in the above-mentioned aspects) in the main scanning direction, the magnification or the scanning start position as a reference, correction is performed so as to offset the shift amounts of the other colors. However, the present invention is not limited to this. Using references predetermined set for all the colors, correction may be performed so as to offset the shift amounts. With such configuration, color shift can be prevented. Furthermore, it is possible to keep the write start positions of the color images in the main scanning direction, the magnification and the scanning start positions in the sub scanning direction constant without being subject to influence of temperature variation. Further, correction is performed using a write end position one of a plurality of colors in the main scanning direction as a reference.

(4) In the above-described aspects, one polygon mirror 51 is used. However, a plurality of polygon mirrors may be used. For example, in the above-described aspects, the polygon mirror may be individually provided for black and cyan, and magenta and yellow for individual scanning. Even with such configuration, the linear relationship as in the above-described aspects can be obtained and thus, color shift can be prevented without requiring the temperature sensor.

(5) In the above-described aspects, the first and second BD sensors 70 and 71 for arranging the scanning start timing of each laser beam are used for reducing the number of sensors. However, another optical detecting sensor other than the above-mentioned BD sensors may be used.

(6) In the above-described aspects, the first BD sensor 70 is disposed at the position where the laser beam Lk can be detected in the vicinity of the write start end to the photoconductive drum 31k, and second BD sensor 71 is disposed at the position where the laser beam Ly can be detected in the vicinity of the write termination end to the photoconductive drum 31y. However, the sensors may be disposed at the other positions. For example, two optical detecting sensors may be disposed in the vicinity of the write start end and the write termination end of the laser beam of one color. Alternatively, the two optical detecting sensors may be disposed in the vicinity of the write start ends or the write termination ends of laser beams of two colors which scan in the opposite directions to each other (in the above-described aspects, black and yellow, cyan and magenta, and the like).

(7) In the above-described aspects, the laser printer 1 is a color laser printer. However, the laser printer may be a monochromatic laser printer.

What is claimed is:

1. An image forming apparatus comprising:
   a frame formed with a resin;
   a polygon mirror disposed at the frame, and having a rotational shaft and a deflection surface rotatable about the rotational shaft;
   a plurality of laser generators disposed at the frame, each of the plurality of laser generators being configured to output a laser beam to the deflection surface;
   a plurality of photosensitive drums, each of which has a photosensitive surface, the laser beam deflected by the deflection surface being irradiated onto the photosensitive surface to scan the photosensitive surface over a scan part in a main scanning direction;
   a first sensor disposed inside and mounted on the frame, and located at a first position to detect the laser beam deflected by the deflection surface for one photosensitive drum;
   a second sensor disposed inside and mounted on the frame, and located at a second position to detect the laser beam deflected by the deflection surface for another photosensitive drum, the second position being different from the first position, wherein the first sensor and the second sensor are provided along a direction orthogonal to the main scanning direction, the first position being a first side of the polygon mirror, the second position being a second side of the polygon mirror opposite to the first side with respect to the polygon mirror, the first position and the second position being asymmetric with respect to the polygon mirror;
   a storage unit storing correspondence information indicating shift of the scan part from a reference scan part in relation to time difference between detections of the laser beam by the first sensor and the laser beam by the second sensor, the correspondence information varying with temperature variation in the frame, the shift of the scan part being caused by change of positions of the first and second sensors caused by the temperature variation;
   a measuring unit configured to measure the time difference between detections of the laser beam by the first sensor and the laser beam by the second sensor;
   a calculating unit configured to calculate, without detecting temperature of the frame, the shift of the scan part corresponding to the temperature variation in the frame, based on both of the time difference measured by the measuring unit and the correspondence information; and
   a controller configured to control the plurality of laser generators to output laser beams based on the shift of the scan part calculated by the calculating unit.

2. The image forming apparatus according to claim 1, wherein the laser beams outputted from the laser generators include a scanning beam and a detection beam,
   wherein the first sensor and the second sensor detect the detection beam,
   wherein the controller controls the laser generator to output the scanning beam based on the shift of the scan part calculated by the calculating unit.

3. The image forming apparatus according to claim 1, wherein the plurality of laser generators includes a first laser generator configured to output a first laser beam to the deflection surface, and a second laser generator configured to output a second laser beam to the deflection surface, the first laser beam including a first scanning beam and a first detection beam, the second laser beam including a second scanning beam and a second detection beam,
   wherein the plurality of photosensitive drums includes a first photosensitive drum and a second photosensitive drum, the first photosensitive drum having a first photosensitive surface, the second photosensitive drum having a second photosensitive surface,
   wherein the first scanning beam deflected by the deflection surface is irradiated onto the first photosensitive surface to scan the first photosensitive surface over a first scan part in the main scanning direction, and the second scanning beam deflected by the deflection surface is irradiated onto the second photosensitive surface to scan the second photosensitive surface over a second scan part in the main scanning direction,
   wherein the first sensor is disposed at the first position to detect the first detection beam deflected by the deflection surface, and the second sensor is disposed at the second position to detect the second detection beam deflected by the deflection surface,
   wherein the storage unit stores correspondence information indicating shift of the second scan part from the first scan part in relation to time difference between detections of the first detection beam by the first sensor and the second detection beam by the second sensor, wherein the calculating unit calculates the shift of the second scan part based on both of the time difference measured by the measuring unit and the correspondence information, wherein the controller controls the second laser generator to output the second scanning beam based on the shift of the second scan part calculated by the calculating unit.

4. The image forming apparatus according to claim 1, wherein the storage unit stores the correspondence information therein as a correspondence table.

5. The image forming apparatus according to claim 1, wherein the image forming apparatus include only the first and the second sensors for detecting each of the laser beam deflected by the deflection surface of each of the plurality of photosensitive drums.

6. The image forming apparatus according to claim 2, wherein the detection beam is part of the scanning beam.

7. The image forming apparatus according to claim 3, wherein the storage unit stores correspondence information indicating shift of the second scan part from the reference scan part corresponding to the first scan part in relation to the time difference.

8. The image forming apparatus according to claim 3, wherein the first scan part includes a first scan start point from which the first scanning beam starts scanning the first photosensitive surface, and the second scan part includes a second scan start point from which the second scanning beam starts scanning the second photosensitive surface, wherein the storage unit stores correspondence information indicating shift of the second scan start point from the first scan start point in relation to the time difference, wherein the calculating unit calculates the shift of the second scan start point based on both of the time difference measured by the measuring unit and the correspondence information, wherein the controller controls the second laser generator to output the second scanning beam based on the shift of the second scan start point calculated by the calculating unit.

9. The image forming apparatus according to claim 3, wherein the first scan part includes a first scan start point from which the first scanning beam starts scanning the first photosensitive surface, a first scan end point at which the first scanning beam ends scanning the first photosensitive surface, and a first scan range between the first scan start point and the first scan end point, wherein the second scan part includes a second scan start point from which the second scanning beam starts scanning the second photosensitive surface, a second scan end point at which the second scanning beam ends scanning the second photosensitive surface, and a second scan range between the second scan start point and the second scan end point, wherein the storage unit stores correspondence information indicating shift of the second scan range from the first scan range in relation to the time difference, wherein the calculating unit calculates the shift of the second scan range based on both of the time difference measured by the measuring unit and the correspondence information, wherein the controller controls the second laser generator to output the second scanning beam based on the shift of the second scan range calculated by the calculating unit.

10. The image forming apparatus according to claim 3, wherein the storage unit stores correspondence information indicating shift of the second scan part in a sub scanning direction orthogonal to the main scanning direction from the first scan part in relation to the time difference, wherein the calculating unit calculates the shift of the second scan part in the sub scanning direction based on both of the time difference measured by the measuring unit and the correspondence information, and wherein the controller controls the second laser generator to output the second scanning beam based on the shift of the second scan part in the sub scanning direction calculated by the calculating unit.

11. The image forming apparatus according to claim 3, further comprising an optical reflection unit configured to reflect the first detection beam and the second detection beam deflected by the deflection surface to be irradiated onto the first and second photosensitive surface, wherein the first sensor detects the first detection beam reflected by the optical reflection unit, and the second sensor detects the second detection beam reflected by the optical reflection unit.

12. The image forming apparatus according to claim 3, wherein the first sensor is disposed at the first position to detect the first detection beam before the first scanning beam starts scanning a first part, and the second sensor is disposed at the second position to detect the second detection beam after the second scanning beam ends scanning a second part.

13. An image forming apparatus comprising:

a frame formed with a resin;

a polygon mirror disposed at the frame, and having a rotational shaft and a deflection surface rotatable about the rotational shaft;

a laser generator disposed at the frame, and configured to output a laser beam to the deflection surface, the laser beam including a scanning beam, a first detection beam and a second detection beam;

a plurality of photosensitive drums, each of which has a photosensitive surface, the scanning beam deflected by the deflection surface being irradiated onto the photosensitive surface to scan the photosensitive surface over a scan part in a main scanning direction;

a first sensor disposed inside and mounted on the frame, and located at a first position to detect the first detection beam deflected by the deflection surface for one photosensitive drum;

a second sensor disposed inside and mounted on the frame, and located at a second position to detect the second detection beam deflected by the deflection surface for another photosensitive drum, the second position being different from the first position, wherein the first sensor and the second sensor are provided along a direction orthogonal to the main scanning direction, the first position being a first side of the polygon mirror, the second position being a second side of the polygon mirror opposite to the first side with respect to the polygon mirror, the first position and the second position being asymmetric with respect to the polygon mirror;

a measuring unit configured to measure time difference between detections of the first detection beam by the first sensor and the second detection beam by the second sensor;

a storage unit storing correspondence information indicating shift of the scan part from a reference scan part in relation to time difference, the correspondence information varying with temperature variation in the frame, the shift of the scan part being caused by change of positions of the first and second sensors caused by the temperature variation;

a calculating unit configured to calculate, without detecting temperature of the frame, the shift of the scan part corresponding to the temperature variation in the frame, based on both of the time difference measured by the measuring unit and the correspondence information; and a controller configured to control the laser generator to output the scanning beam based on the shift of the scan part calculated by the calculating unit.

14. The image forming apparatus according to claim 13, wherein the image forming apparatus includes only the first and the second sensors for detecting each of the laser beam deflected by the deflection surface of each of the plurality of photosensitive drums.

* * * * *